United States Patent [19]

Dulin

[11] 3,968,057

[45] July 6, 1976

[54] METHOD FOR PRODUCING A SEMI-CONDUCTOR BODY

[75] Inventor: Francis H. Dulin, Oakland Township, Oakland County, Mich.

[73] Assignee: Champion Spark Plug Company, Toledo, Ohio

[22] Filed: Oct. 25, 1974

[21] Appl. No.: 517,945

[52] U.S. Cl. .................................. 252/516; 106/44; 264/104
[51] Int. Cl.² .......................................... H01B 1/04
[58] Field of Search ...................... 252/516; 106/44; 264/60, 65, 66, 104

[56] References Cited
UNITED STATES PATENTS 3,274,311 9/1966 Watson et al. .................. 264/125 X
3,376,367 4/1968 Subramanya et al. .......... 252/516 X

FOREIGN PATENTS OR APPLICATIONS 1,179,365 1/1970 United Kingdom

Primary Examiner—Benjamin R. Padgett
Assistant Examiner—E. Suzanne Parr
Attorney, Agent, or Firm—John C. Purdue

[57] ABSTRACT

A method for producing a semi-conductor body is disclosed. The batch for the body is silicon carbide and reactive alumina. The batch is first dry ball milled with from ½ to 2% fatty acid and pressed into a shape. The shape is then fired either in air below 2300°F. or in an inert gas atmosphere to a temperature from about 2000° to 3000°F., and for a time sufficiently long to produce a semi-conductor body having a specified apparent porosity. An impregnation step is also disclosed to achieve the specified apparent porosity.

9 Claims, No Drawings

METHOD FOR PRODUCING A SEMI-CONDUCTOR BODY

BACKGROUND OF THE INVENTION

This invention relates to a method for producing a semi-conductor body which is useful in a jet engine igniter of the high energy type, which, in service, is fired by an ignition system which includes a capacitor. The semi-conductor body is incorporated in the high energy igniter so that a portion of a surface thereof is adjacent a spark gap between a center electrode and a ground electrode. The function of the semi-conductor is to enable the spark discharge across the igniter gap to occur at lower applied voltages. Lower voltages decrease the weight and bulk of insulation required at high altitudes and thereby permit higher energy storage and discharge.

Various electrically semi-conducting ceramic bodies have heretofore been suggested and used in igniters for low voltage ignition systems: see, for example, U.S. Pat. Nos. 3,037,140 and 3,046,434. Improved semi-conductor bodies made by hot pressing mixtures of alumina and silicon carbide are disclosed in U.S. Pat. No. 3,558,959. The hot pressed alumina silicon carbide semi-conductors perform satisfactorily under operating conditions more severe than those previously known semi-conductors were capable of withstanding, but their production proved to be complicated and expensive. For example, it was not found to be possible to produce bodies of the required shape by the hot pressing technique; instead, it was found to be necessary to shape the extremely hard alumina silicon carbide body subsequent to hot pressing by boring, honing and grinding with diamond tools.

In U.S. patent application Ser. No. 321,563 (Series of 1970) it was disclosed that a very satisfactory semi-conductor body can be produced without hot pressing or extensive shaping operations. The method disclosed and claimed therein essentially the steps of pressing a batch of silicon carbide, alumina, and various calcium and magnesium compounds into a shape; firing the shape first in air; and firing the resulting body a second time in an inert atmosphere, producing a desired semi-conductor body. The first firing is at a temperature of from about 2050° to 2100°F. for a time sufficiently long to convert in situ a predetermined portion of the silicon carbide to silicon dioxide. The resulting body is then fired in an inert gas atmosphere to a temperature from about 2450° to 2750°F. to produce a semi-conductor body having a specified apparent porosity.

It has also been suggested (see, for example, U.S. Pat. Nos. 3,376,367 and 3,573,231) that semi-conductors can be produced from silicon carbide and aluminum silicate or the like by forming an article of the desired shape, embedding the article in a mass of silicon carbide particles, and firing. The aluminum silicate can be a part of the batch from which the original shape is formed, or it can be produced in situ by firing the shape in air for one-half hour at 2000°F. to cause oxidation of silicon carbide to $SiO_2$, which can then react with alumina in the shape to produce the aluminum silicate.

The mechanism by which an $Al_2O_3$ – SiC semi-conducting body operates is not fully understood, but two theories have been proposed which in no way should be construed as a limitation to the scope of this invention.

One theory suggests that when a voltage is applied to the center electrode, there is a limited flow of current along the semi-conductor surface. This current flow causes ionization of gas in the spark gap. The ionization enables a spark discharge to occur at a lower voltage than would be required without the ionization. Discharge of the previously charged capacitor occurs when there is a spark between the ground and center electrodes. The large size of the capacitor is responsible for the high energy nature of the spark.

Another theory suggests that because a small space of about 0.0005 inch exists between the center electrode and the semiconducting body, electrical charges of opposite polarity build up on the surface of the center electrode and the semiconductor such as in the polarization of opposing faces of a capacitor. Ionization of gas in this small space or microgap within the ignitor gap permits an initial spark discharge at a low applied voltage. This partial discharge is believed to cause a cascade ionization and discharge across the main gap.

An extension of this theory proposes that the porosity of the semi-conductor surface assists the cascade process by providing a series of microgaps between conducting silicon carbide grains which may become charged, ionized and discharged in rapid succession. The presence of a nonconducting phase such as alumina serves not only to bond the conducting grains of silicon carbide, but also to prevent a direct short circuit. Controlled spacing and contact of the silicon carbide grains is obtained by means of the porosity and the alumina as well as the grain size and amount of silicon carbide.

Optimum control of semi-conductor performance has been found to occur when the porosity is between 10 and 25% and when surface electrical resistance is between 1 and 200 megohms at 500VDC.

The porosity has also been found to have a desirable influence on the resistance to spark erosion of the semi-conducting body. The low thermal conductivity imparted by the porosity is believed to restrict the high heat generated by the spark to the surface. This would limit the destructive melting and expansion stresses to the surface.

It is apparent that a very strong bond is necessary to hold the silicon carbide grains in the presence of the large required void space. Aluminum oxide has a high mechanical strength relative to silicates, glass and many other oxides. The mechanical integrity of the network of alumina which forms after sintering is far superior to other sintered bond materials. Aluminum oxide has previously given too low a density when it is the sole bond material in cold pressed and sintered bodies. It could only be satisfactorily used when formed by hot pressing or when fired in an embedment of grain in air in prior art to form an aluminum silicate with the oxidation product of silicon carbide.

SUMMARY OF THE INVENTION

The instant invention is based upon the discovery of an improved method for producing a silicon carbide semi-conductor. The first step in producing a semi-conductor according to the invention involves mixing from 20 to 80 parts by weight of silicon carbide with from 20 to 80 parts by weight of reactive alumina.

It has been found that the particle sizing of the silicon carbide is critical; when the silicon carbide is too fine or too coarse the applied voltage necessary to cause sparking is excessively high or the rate at which erosion of the semi-conductor body occurs under service conditions is excessive, respectively.

In general, substantially all of the silicon carbide particles should range from about 150 mesh to 600 mesh. Finer silicon carbide particles, 800 mesh, can be used in an 800/400 mixture.

The alumina used in the instant invention is "reactive" alumina, which can be defined as alumina having an increased surface energy and surface area by virtue of decreased particle size and a surface relatively free of hydroxyl ions. The particle sizing of the alumina is critical in order to insure adequate sintered bond strength by solid state diffusion during firing. Substantially all of the alumina should be finer than about 2 microns particle size.

Dry ball milling of the mixture is essential to control the apparent porosity of the final body. It has generally been found that a sintered body of higher density will result from a dry milled batch than from a wet milled batch.

A shape is then pressed from the mixture and is fired in an inert gas atmosphere to a temperature from about 2000° to 3000°F., the time and temperature of this firing being controlled so that the apparent porosity of the final body is from substantially 10 to 25 percent.

Accordingly, it is an object of this invention to provide a semi-conductor composition suitable for use in a high energy igniter system.

It is a further object of this invention to provide an alumina-bonded silicon carbide semi-conductor composition.

DESCRIPTION OF THE PREFERRED EMBODIMENTS

The preferred embodiments of the instant invention are described in the following examples, wherein the terms "percent" and "parts" refer to percent and parts by weight. All sizing is reported as standard mesh per linear inch, Tyler screen series.

EXAMPLE I

A small ball mill was charged with 26 parts substantially 400 mesh silicon carbide, 26 parts substantially 800 mesh silicon carbide, 48 parts $Al_2O_3$, and 1 part oleic acid. The $Al_2O_3$ used had an average particle size of 0.6 to 0.9 microns. The charge was dry milled 2 hours. Solid cylinders having a diameter of 0.5 inch, a bore of 0.102 inch, and a height of 0.38 inch were then pressed from the milled charge under a pressure of 20,000 pounds per square inch.

The solid cylinders were then placed in a periodic kiln of the muffle type, and the muffle was purged with helium. A helium atmosphere was maintained in the muffle throughout firing, which was to a maximum temperature of 2725°F., 1 hour at temperature.

The fired bodies were determined to have an apparent porosity range of 20.4–20.6 percent, a bulk density range of 3.538–3.544.

The fired solid cylindrical bodies produced as described in Example I were diamond ground to have an exterior cylindrical surface 0.350 inch in diameter, a height of 0.265 inch and a 0.100 inch bore diameter. The ground buttons were then placed in a sparking fixture, spring loaded in position so that a portion of one flat surface of each was in mechanical and electrical contact with a ground electrode of the fixture and spaced by 0.001 to 0.002 inch from a center electrode thereof, spark gap 0.050 inch. The minimum voltage required to sustain sparking in an ignition circuit which included a 1.5 microfarad condenser was found to be 1270 volts under atmospheric pressure and 1580 volts under a pressure of 100 pounds per square inh gauge. The resistance of the buttons, measured with a 500 volt Megger while mounted in the assembly before the test, as described, was found to be 44 megohms. The ground semi-conductors, mounted in the assembly, were sparked for one hour at 12 joules under a pressure of 100 pounds per square inch gauge, 70 sparks per minute, and the erosion, as indicated by weight loss in grams, was found to be 0.0003. The ignition system, during this erosion test, supplied 2000 volts, and had a total capacitance of 6 microfarads. The data reported in this paragraph represent averages of 8 tests.

Tests were conducted to determine the optimum temperature for firing the semi-conductor composition in both air and inert gas atmosphere.

The lowest useful temperature for firing in an inert atmosphere appears to be about 2000°F. The firing temperature can be 3000°F. without detriment. Increased temperatures tend to cause a small reduction in the apparent porosity of the fired semi-conductor. Helium, nitrogen or argon can be used.

Tests indicate that lower temperatures are preferable for firing of the semi-conductor composition in air to minimize oxidation of the silicon carbide. As the SiC particle size decreases there is a tendency for the voltage requirement to increase. A temperature range of 1900° to 2300° F. is useable; 2000° to 2200° F. is preferred.

As described hereinbefore, the use of "reactive alumina" having an absence of hydroxyl ions present on the surface is important. It is believed that the reactivity of the alumina is maintained by dry milling which avoids particle re-agglomeration and hydrate formation which can occur in wet milling. The presence of water gives poor sintering, with a resultant porosity of about 30 percent instead of the preferred porosity of 20 to 25 percent.

EXAMPLE II

A series of alumina-bonded SiC semi-conductor compositions was prepared as described in Example I to determine the effect of varying the SiC content. Test results are shown below.

TABLE I

| SiC % | $Al_2O_3$ % | SiC Mesh Size | Sustain Spark Volt Req't at 1.5 mfd | | Spark Erosion Rate (gm/hr) | Open Porous Range (Avg. %) | Resistance Ohms .050" Ass'y |
|---|---|---|---|---|---|---|---|
| | | | Atm. | 100 psi. | | | |
| 20 | 80 | 800/400;1:1 | 2640 | — | — | 17.0 | 200 M |
| 25 | 75 | 800/400;1:1 | 2667 | — | — | 16.8 | 200 M |
| 30 | 70 | 800/400;1:1 | 2520 | 2353 | .0011 | 17.7 | 200 M |
| 35 | 65 | 800/400;1:1 | 1827 | 2467 | .0007 | 18.3 | 167 M |
| 40 | 60 | 800/400;1:1 | 1080 | 1647 | .0002 | 18.8 | 53 M |
| 52 | 48 | 800/400;1:1 | — | 840 | .0001 | — | 100 M |
| 60 | 40 | 800/400;1:1 | 913 | 807 | .0004 | 22.6 | 21.7 M |
| 65 | 35 | 800/400;1:1 | 900 | 773 | .0003 | 23.3 | 46.7 M |

TABLE I-continued

| SiC % | Al₂O₃ % | SiC Mesh Size | Sustain Spark Volt Req't at 1.5 mfd | | Spark Erosion Rate (gm/hr) | Open Porous Range (Avg. %) | Resistance Ohms .050" Ass'y |
|---|---|---|---|---|---|---|---|
| | | | Atm. | 100 psi. | | | |
| 70 | 30 | 800/400;1:1 | 1167 | 627 | .0002 | 24.7 | 26.7 M |
| 75 | 25 | 800/400;1:1 | 1127 | 833 | .0004 | 26.3 | 33.3 M |
| 80 | 20 | 800/400;1:1 | 873 | 773 | .0011 | 28.4 | 117 M |
| 60 | 40 | 600 | 1120 | 800 | .0011 | — | 30 M |
| 70 | 30 | 600 | 760 | 300 | .0027 | — | 11 M |
| 80 | 20 | 600 | 1840 | 1000 | .0026 | — | 30 M |
| 20 | 80 | 400 | 2500 | 2500 | — | 16.3 | 200 M |
| 25 | 75 | 400 | 2290 | 1920 | — | 16.7 | 200 M |
| 30 | 70 | 400 | 1173 | 1400 | .0017 | 16.1 | 80 M |
| 35 | 65 | 400 | 1167 | 1453 | .0019 | 17.7 | 25 M |
| 40 | 60 | 400 | 1140 | 1280 | .0013 | 18.6 | 45.7 M |
| 52 | 48 | 400 | 1600 | 1120 | .0012 | — | 6 M |
| 60 | 40 | 400 | 680 | 800 | .0007 | — | 5 M |
| 70 | 30 | 400 | 1400 | 900 | .0039 | — | 8 M |
| 80 | 20 | 400 | 600 | 600 | .0037 | — | 9 M |
| 52 | 48 | 320 | 640 | 720 | .0009 | — | 6 M |
| 60 | 40 | 320 | 1500 | 1160 | .0003 | — | 40 M |
| 70 | 30 | 320 | 1240 | 840 | .0016 | — | 11 M |
| 80 | 20 | 320 | 300 | 300 | .0016 | — | 10 M |
| 25 | 75 | 150 | 2390 | 2510 | .0600 | 18.3 | 200 M |
| 25 | 75 | 80 | 1950 | 2270 | .0070 | 16.6 | 200 M |
| 20 | 80 | 60 | 2750 | 2470 | — | 15.6 | 200 M |

In finer particle-sized SiC compositions, using an 800/400 mixture, the lower useable SiC content is about 35 percent. Such 800/400 mixtures containing less than 35 percent SiC have increased voltage requirements which exceed 2000 volts and are not desirable.

As the SiC content increases, the spark erosion rate also increases; thus the maximum SiC content is near or slightly above 80 percent SiC. Although the spark erosion rate obtained for an 80/20 SiC—Al₂O₃ mixture was higher than that obtained for lower SiC content mixtures, the 80/20 composition was considered satisfactory.

Test results obtained for the coarser 400 mesh SiC compositions indicated that the lower useable SiC content is about 25 percent SiC. Compositions based on 400 mesh SiC and containing less than 25 percent SiC have an increased spark erosion rate. Test results of compositions containing 60 mesh SiC particles indicated that low SiC contents of 20–25 percent were feasible. However, the compositions had high voltage requirements and increased spark erosion rates.

EXAMPLE III

A series of alumina-bonded SiC semi-conductor compositions was prepared as described in Example I to determine the particle size limits of SiC. Test results are shown below:

TABLE II

| SiC % | Al₂O₃ % | SiC Mesh Size | Sustain Spark Volt Req't. at 1.5 mfd. | | Spark Erosion Rate (gm/hr) | Open Poros. Range (Avg.%) | Resistance Ohms .050" Ass'y |
|---|---|---|---|---|---|---|---|
| | | | Atm. | 100 psi | | | |
| 52 | 48 | 800 Mesh | 2550 | 2040 | .0004 | 23.1 | 125 M |
| 52 | 48 | 600 | 1805 | 1570 | .0002 | 21.6 | 15.8 M |
| 52 | 48 | 400 | 527 | 760 | .0019 | 21.0 | 4.5 M |
| 52 | 48 | 320 | 1160 | 750 | .0013 | 19.2 | 8.1 M |
| 52 | 48 | 220 | 670 | 1130 | .0015 | 19.2 | 330 K |
| 52 | 48 | 150 | 270 | 1050 | .0019 | 18.8 | 390 K |
| 52 | 48 | 60 | 710 | 750 | .0044 | 18.7 | 3.8 M |
| 52 | 48 | 600/400;1:1 | 1395 | 1140 | .0003 | 20.9 | 10.5 M |
| 52 | 48 | 600/320;1:1 | 1375 | 1230 | .0008 | 19.6 | 8.8 M |

As shown by the test results above, the SiC fine particle size limit appears to be about 600 mesh. As the SiC particle size decreases, the voltage requirement increases. For example, while 600 mesh SiC has a voltage requirement of 1805 volts, 800 mesh SiC has an undesirably high voltage requirement of 2550 volts. As indicated previously in Example I, 800 mesh SiC particles can be used in conjunction with 400 mesh particles.

The SiC coarse particle size limit appears to be about 150 mesh. As the SiC particle size increases, the spark erosion rate also increases. Compositions containing 220 and 150 mesh SiC particles have a greater erosion rate than compositions containing 600 and 800 mesh SiC.

EXAMPLE IV

A series of alumina-bonded SiC semi-conductor compositions was prepared as described in Example I to determine the effect of the addition of coarse SiC particles (60 and 150 mesh) to the composition of Example I. Test results are given below:

TABLE III

| SiC % | Al₂O₃ % | SiC Mesh Size | Sustain Spark Volt Req't at 1.5 mfd | | Spark Erosion Rate (gm/hr) | Open Poros. Range (Avg.%) | Resistance ohms .050" Ass'y |
|---|---|---|---|---|---|---|---|
| | | | Atm. | 100 psi | | | |
| 52 | 48 | 800/400 | 1270 | 1580 | .0003 | 20.5 | 44 M |
| 52 | 48 | 800/400/150 (23:23:6) | 750 | 810 | .0031 | 20.6 | 9.1 M |
| 52 | 48 | 800/400/60 (23:23:6) | 855 | 1080 | .0008 | 20.4 | 21 M |
| 52 | 48 | 800/400/60 (20:20:12) | 650 | 925 | .0011 | 19.9 | 13.5 M |

The test results shown above indicate that addition of coarse SiC particles produced a substantial decrease in the voltage requirement accompanied by an increase in the spark erosion rate.

The high melting temperature of aluminum oxide is a principal advantage in the instant invention because it enables the composite semi-conductor to resist the extremely high temperature of the discharge arc. This is indicated by the very low spark erosion loss obtained by the use of aluminum oxide compared to silicate types of bond materials. Previously, compromises have had to be made in melting temperature of the bond to enable forming by cold pressing and sintering directly to the desired shape and size. Such compromises take the form of silicate minerals or silicate glasses as in prior art.

It will be appreciated that the electrical conductivity of bodies produced according to the method of the invention can occur only through the silicon carbide particles therein, and that the electrical resistance of such bodies depends upon the effectiveness of the electrical contact among silicon carbide particles therein. Thus, it is very important that the firing be controlled so that an open porosity from substantially 10 to 25 percent is achieved. The reason for this is not fully understood, but it will be appreciated that a body of the type in question can be considered, from the electrical standpoint, as a three-phase material. Silicon carbide is the electrically conducting phase, while there are two insulating phases: (1) the solid constituents of the body other than silicon carbide and (2) the gaseous or vaporous phase filling the open pores. It is clear from the foregoing that a controlled amount of the second gaseous or vaporous insulating phase is highly desirable to minimize erosion under service conditions.

It has been found that the electrical resistance and the minimum voltage required to sustain sparking can both be lowered by adding a limited amount of a ferrite, e.g., iron oxide, cobalt oxide or nickel oxide to the batch. The ferrite can be used in amounts ranging from about 1 percent to about 3 percent of the body, and influences the electrical properties as indicated by lowering the resistance of the solid phase other than silicon carbide. It is usually preferred, however, if possible, to achieve the desired electrical properties without the use of a ferrite because, when a ferrite is used, the properties can vary under service conditions as a consequence of changes in the oxidation state of the ferrite or ferrites.

Other fatty acids can be substituted for oleic acid. U.S. Pat. No. 3,274,311 discloses the use of acid such as stearic and naphthenic acid. Addition of fatty acid not only helps to prevent powder packing in a ball milling operation, but serves as a pressing lubricant wherein higher densities can be obtained.

It has also been found that the apparent porosity of a body of the type produced by the method of the instant invention can be reduced by impregnation with either an organic ammonium silicate or a hydrolyzed organic silicate.

In the case of impregnation with an organic silicate, the body can be soaked in a solution thereof, treated with a gelling agent to form silica hydrate, dried and calcined to convert the hydrate to $SiO_2$. The organic silicate can be an alkyl or aryl silicate; the gelling agent can be an acid gas such as $CO_2$, a basic gas such as $NH_3$, or an acid-or base-releasing compound. Magnesium fluoride can be used as an acid-releasing compound.

For example, the body can be treated with ethyl silicate by soaking in a solution thereof, treated with ammonia gas for 2 hours, dried at 220°F. for 16 hours and calcined at 1000°F. for 1 hour.

In the case of the ammonium silicate, the body can merely be soaked in a solution thereof, treated with carbon dioxide gas to gel the silicate, and then dried and calcined, as described.

It has also been found that the spark erosion rate varies with percent open porosity in substantially the same manner whether a fired body is produced having a given open porosity, or that porosity is achieved by either of the impregnation techniques discussed in this paragraph. Accordingly, semi-conducting bodies useful in jet igniters, as explained previously can be produced by controlling the firing so that the as-fired bodies have high porosities, and then using the impregnation technique, as described, to produce the desired final porosity. It has been found that about a 10 percent reduction in porosity can be achieved by a single impregnation with the ethyl silicate, and about 35 percent reduction can be achieved with the ammonium silicate, using a single impregnation, in each case. When the bodies are impregnated twice, approximately a 30 percent decrease in open porosity can be achieved with the ethyl silicate, and approximately a 65 percent decrease in open porosity can be achieved with the ammonium silicate.

What I claim is:

1. A method for producing a semi-conductor body which consists essentially of mixing from 20 to 80 parts by weight of silicon carbide substantially all of which has a particle size from 150 to 800 mesh, with from 80 to 20 parts by weight of reactive alumina, substantially all of which has a particle size less than about 2 microns, dry ball milling the mixture for about 2 hours with from ½ to 2 percent by weight fatty acid, based on the alumina, pressing a shape from the resulting mixture and firing the shape to a temperature from about 1900° to 3000° F., with the proviso that the firing, when in air, is to a temperature from about 1900° to 2300° F. and when in an inert gas atmosphere, is to a temperature from about 2000° to 3000° F., and for a time sufficiently long to produce a semi-conductor body having an apparent porosity from substantially 10 to 25 percent.

2. A method as claimed in claim 1 wherein from 30 to 80 parts by weight 400 mesh silicon carbide and 70 to 20 parts by weight alumina are present.

3. A method as claimed in claim 2 wherein 52 parts by weight silicon carbide and 48 parts by weight alumina are present.

4. A method as claimed in claim 1 wherein from 10 to 40 parts by weight 400 mesh silicon carbide, from 10 to 40 parts by weight 800 mesh silicon carbide, and from 20 to 80 parts by weight alumina are present.

5. A method as claimed in claim 4 wherein about 26 parts by weight 400 mesh silicon carbide, about 26 parts by weight 800 mesh silicon carbide and about 48 parts by weight alumina are present.

6. A method as claimed in claim 1 wherein the fatty acid is oleic acid.

7. A method as claimed in claim 1 wherein prior to firing, the shape is impregnated with a silicate selected from the group consisting of ammonium silicate and ethyl silicate, treated with a gelling agent selected from the group consisting of a basic gas, an acid gas and an acid- or base-releasing compound, and dried.

8. A method as claimed in claim 7 wherein the organic silicate is ethyl silicate.

9. A method as claimed in claim 7 wherein the gelling agent is selected from the group consisting of $CO_2$ and $NH_3$.

* * * * *